Jan. 3, 1956  M. O. EGGUM  2,729,499
AUXILIARY FRAME FOR TRUCK BOXES
Filed May 4, 1953  2 Sheets-Sheet 1
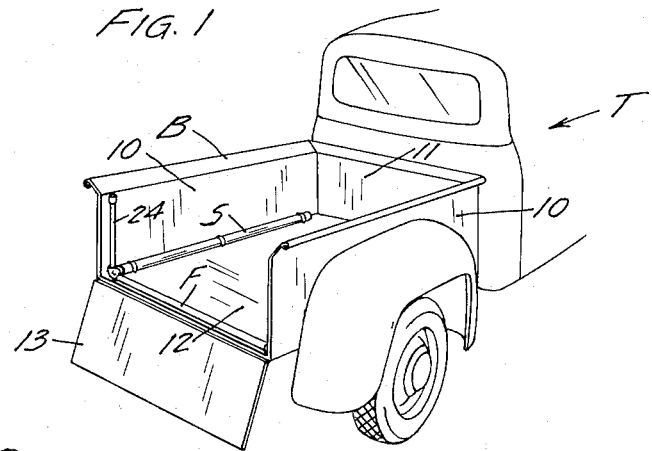
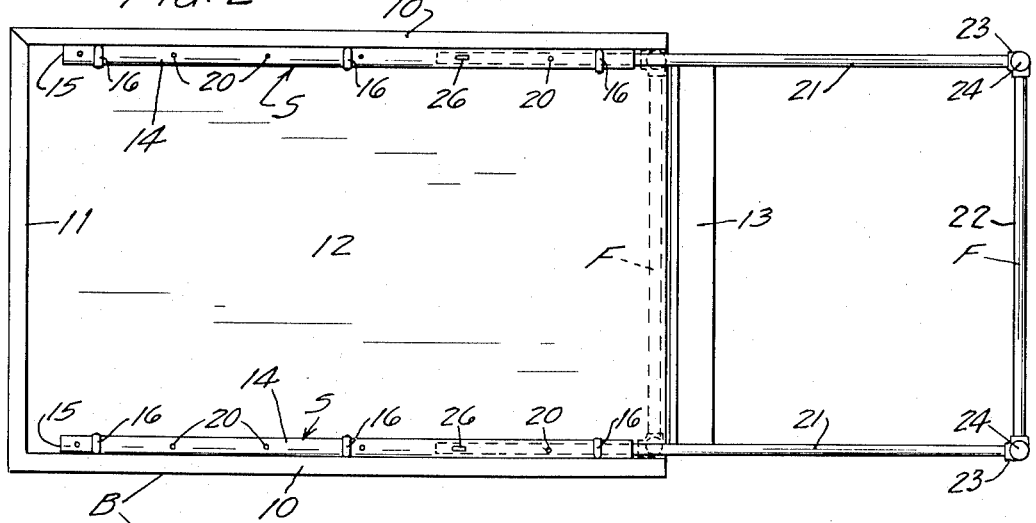
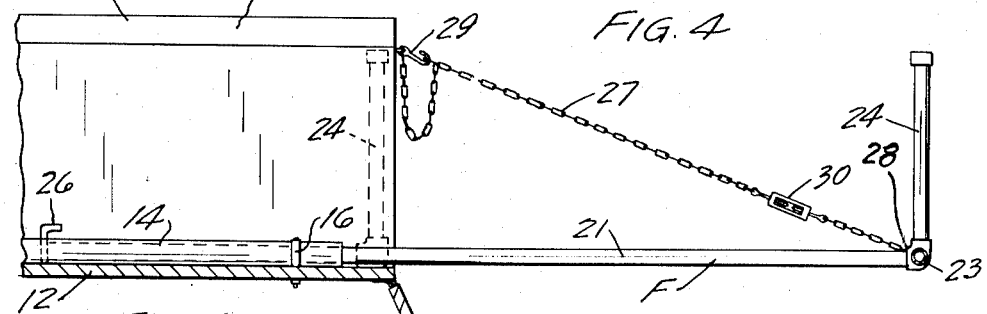
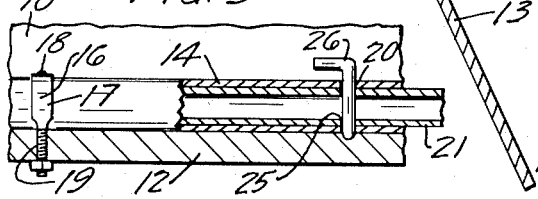
INVENTOR
MURNAT O. EGGUM
BY
Williamson, Williamson, Schroeder, & Adams
ATTORNEYS Jan. 3, 1956  M. O. EGGUM  2,729,499
AUXILIARY FRAME FOR TRUCK BOXES
Filed May 4, 1953  2 Sheets-Sheet 2
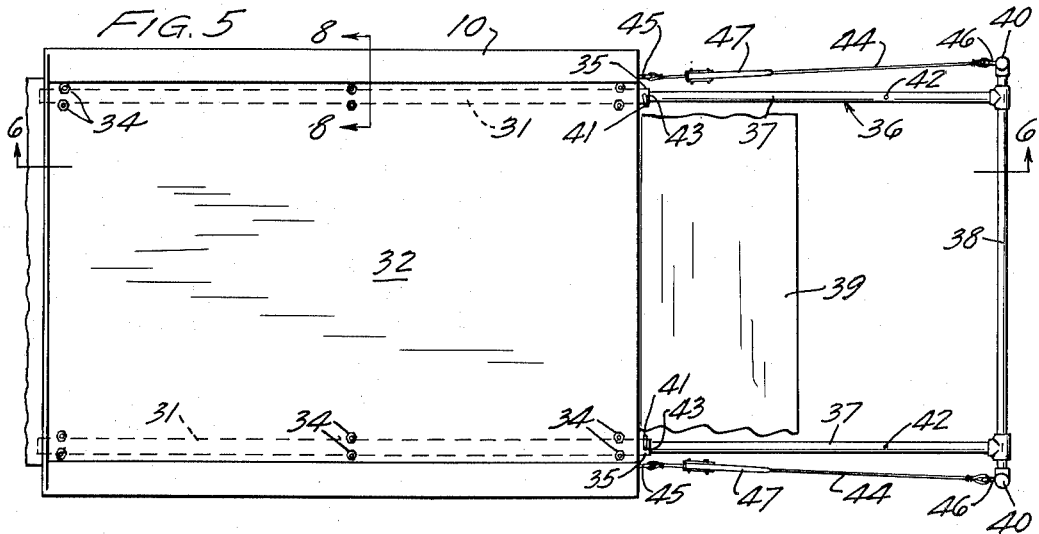
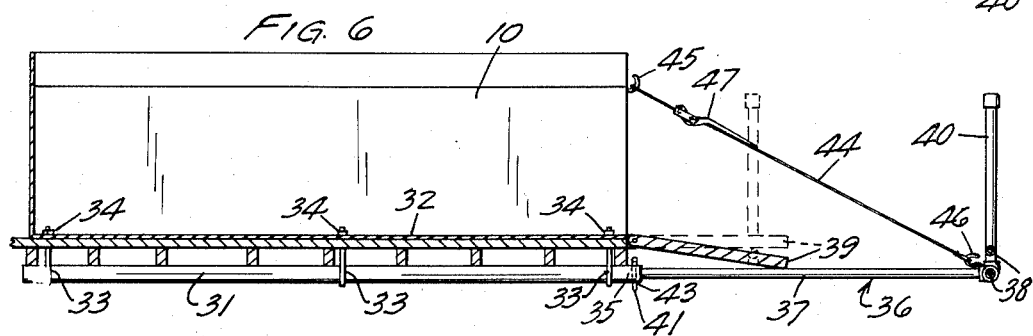
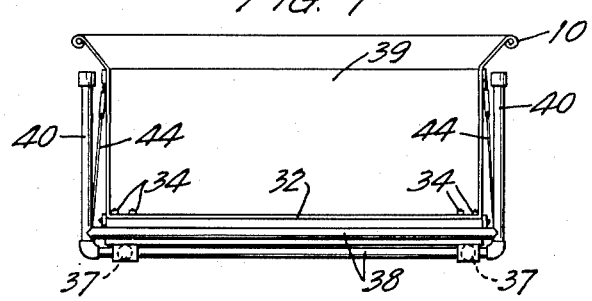
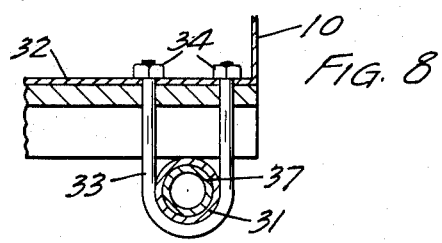
INVENTOR
MURNAT O. EGGUM
BY Williamson, Williamson, Schroeder & Adams
ATTORNEYS United States Patent Office 2,729,499
Patented Jan. 3, 1956

2,729,499

AUXILIARY FRAME FOR TRUCK BOXES

Murnat O. Eggum, St. Paul, Minn.

Application May 4, 1953, Serial No. 352,781

3 Claims. (Cl. 296—26)

This invention relates to an auxiliary frame for truck boxes and the like and more particularly to an extendible rack or frame which is adapted to effectively increase the utility of a small truck box.

It has been common practice in the case of small trucks such as those commonly called "pickup" trucks to build a rack or super structure which will provide a supporting framework for articles of unusual length such as ladders and scaffolding. Thus, contractors, painters, carpenters, bricklayers and construction workers in general, have felt the need of providing means in combination with a small truck for carrying long articles supported longitudinally of the truck.

If the center of gravity of the articles occurs more than six or seven feet from each end, then such articles cannot safely be carried in the ordinary box of a pickup truck. Furthermore, when scaffolding and ladders are placed upon a super structure overlying the cab portion of the pickup truck, the entire load is unstable and several trips must be made to carry the weight which the truck would be normally capable of carrying were it not for the unusual length of the articles. In addition, the rack usually has limited strength and bends easily when abused. Loading cumbersome articles at a high level unnecessarily taxes the strength of the operator but has been considered a necessary evil in connection with the transportation of ladders, scaffolding, long timbers, pipes, etc. by means of a small pickup truck.

It is therefore an important object of this invention to provide an auxiliary frame for increasing the effective length of the box of a pickup truck so that long articles can be safely carried at approximately the ordinary level of the box and without concern for the center of gravity in the case of ordinary ladder and scaffolding equipment.

It is another object of the invention to provide for an extendible rack which does not substantially reduce the floor area nor the cubic volume of the pickup box and which, in both its extended and retracted positions, does not traverse useful area or space within the pickup box.

It is a further object of the invention to provide for a stable and strong rack or framework which can be employed in conjunction with the box of a pickup truck while maintaining the useful proportions of the box, the rack or framework being adjustable rearwardly of the box in one of several preselected positions to suit the length of the articles to be carried cooperatively on the rack and the pickup box.

It is a still further object of the invention to provide for a simple and cheap frame structure which will be effective in permanent cooperation with a pickup box to efficiently accommodate articles of such length and weight as would be difficult or impossible to balance and carry upon the box alone and inconvenient or hazardous to support upon conventional superstructure built over the box and cab of a pickup truck.

These and other objects and advantages of my invention will more fully appear from the following description made in connection with the accompanying drawing wherein like reference characters refer to similar parts throughout the several views and in which:

Fig. 1 is a perspective view of the box portion of a pickup truck with my auxiliary frame in retracted position;

Fig. 2 is a top view of the box portion of the pickup truck shown in Fig. 1, the auxiliary framework being extended rearwardly;

Fig. 3 is an enlarged segmental view, partly in section, of one of the sleeves and a telescoping arm therewithin;

Fig. 4 is another form of my invention in which bracing means are cooperatively employed with the truck box and framework, parts being broken away and vertically sectioned to show one half of the symmetrical framework;

Fig. 5 is a top view of an alternate form of sleeve mounting on a truck box;

Fig. 6 is a vertical section taken on line 6—6 of Fig. 5, the position of the partially extended frame being shown in dotted lines;

Fig. 7 is a rear view of Fig. 6; and

Fig. 8 is a vertically sectioned segment of the bracket mounting taken on lines 8—8 of Fig. 5.

Referring now more particularly to the drawing, Fig. 1 discloses a truck T of the pickup variety having a box portion indicated generally at B. The box B presents a substantially rectangular structure having side panels 10, a front wall 11 and a bottom 12. Most of the conventional pickup type trucks are likewise furnished with a rear wall 13 which may be hingedly secured to the bottom 12 and normally held in upright position by such means as hasps or latches (not shown).

My invention comprises an auxiliary framework or rack having a sheath structure S which is rigidly secured to the truck box B and a telescoping support frame F which is adjustably mounted upon the sheath structure S as shown in Figs. 1 and 2.

More particularly, the sheath structure S comprises a pair of edge mounted sleeves 14 which are preferably secured at the inside juncture of each of the side walls 10 with the bottom 12. It is preferred that the sleeves be elongated and closely adjacent the edge for a substantial length therealong. Each of the sleeves 14 preferably terminates in an end 15 which is in spaced clearance with the forward wall 11 of the box. The space clearance provides means for cleaning out all dirt or foreign material which might have become lodged within the sleeve members 14. I prefer to employ cylindrical sleeves 14 although it is understood that any other shape such as a hollow polygonal cross section might be employed. The sheath structure has securing means such as the brackets 16 for rigidly holding each of the sleeves 14 in position on the box bottom 12. The brackets are preferably of a general L-shape having ends respectively secured to the side walls 10 and to the bottom 12 as shown in Figs. 2 and 3. I prefer to use a bracket member 16 having a rounded strap body 17 terminating at right angled threaded ends 18 and 19 which in turn extend through the walls 10 and the bottom 12 in rigidly secured relation therewith.

Also formed in the sleeve members are spaced holes or openings 20 for a purpose to be described presently. Where the box B is of general rectangular shape, the sleeve members 14 will be in spaced parallel relation as shown in Fig. 2. It will be noted that very little of the cubical space or of the area of the floor or bottom 12 has been taken up by the sheath structure S. As a matter of fact, the sleeves 14 comprising the sleeve structure will act as a bumper or guide to prevent heavy and sharp objects from marring the inside surfaces of the walls 10 while still allowing the major portion of the bottom 12 to be available for supporting loads and objects. The sheath structure S is intended to be a permanent installation in the truck box B but, if for any reason it is desired to remove the auxiliary framework, as for example, when remounting the framework upon another truck, the brackets 16 may simply be unfastened so as to dismount the entire unit.

The support frame F is telescopically received within the sheath structure S and preferably comprises a pair of telescoping arms 21 which will slide respectively within sleeves 14. At the outer extension of the support frame F is a cross bar or brace 22 which is rigidly interconnected between the telescoping arms 21. At the connection therebetween a three-way joint 23 may be employed, the joint also having provision for an upright retaining member such as the stake 24 at each of the corners.

Each of the telescoping arms 21 may have an opening 25 which is adapted to align itself with one of the openings 20 in the sleeve member 14. When thus aligned, a pin or key 26 may be placed therethrough so as to rigidly retain the telescoping support frame F at an adjusted position within the sheath structure S. When the support frame is in retracted position as shown in Fig. 1, it is entirely within the cubical space of the box B, yet does not detract from the capacity of the box materially. When the rear door 13 is in lower position and the support frame F has been extended to the position shown in Fig. 2 with the key or pin 26 in its proper position, the framework F still defines substantially a continuation of the side and bottom planes of the original box B.

Referring now to Fig. 4, I have provided an additional element in the form of bracing means such as a flexible chain 27 which is secured between a fastening means 28 at each side of the support frame F and cooperative fastening means 29 attached at each side of the box B at the rear portion thereof. I prefer to use a chain length 27 such as will exactly be tensioned between the fastening means 28 and 29 when the framework F is extended to its fullest position. When thus employing bracing means such as chain 27, I prefer not to align openings 25 in the telescoping arms 21 with the openings 20 in sleeves 14, but rather abut the free ends of the telescoping arms against the pins or keys 26 in their preselected corresponding positions in openings 20. Thus, when the support frame F is at an intermediate position as shown in Fig. 4 the pin 26 will be at an intermediate position within each of the sleeves 14. A suitable link of the chain 27 is then secured over the hook or fastening means 29 and an interposed turnbuckle 30 on each of the chains 27 is tightened up until the free end of the telescoping arm 21 is firmly abutted against each of the pins 26 to provide a reinforcing for the support frame F.

In the use and operation of my auxiliary framework the support frame F is extended rearwardly to the predetermined position necessary to support a load beyond its center of gravity and the pins 26 are placed through openings 20 in the sheath structure S and through aligned openings 25 within the telescoping support frame F. The adjustment is extremely simple and will accommodate a heavy and long load which is ordinarily not capable of being carried at all in a pickup truck box. In the form shown in Fig. 4, where the additional bracing means is employed, the support frame will be extremely sturdy even though extended to its fullest limit. In such case, the pins or keys 26 are placed in predetermined openings 20 of the sheath structure S beyond the ends of the telescoping arms 21. The support frame F is then slightly retracted until it abuts the keys or pins 26 and the chain 27 is tensioned slightly with the appropriate link in position on the fastening element 29 at each side of the box. The turnbuckle 30 is then tightened until the arms 21 are supported by the bracing means 27 rather than the sheath structure S. With the load placed upon the extended framework F, to which has been added the bracing means 27, the bulk of the load will be carried by the cross bar 22 and the bracing means 27. The telescoping arms 21 will thus be stressed against the pin 26 so as to distribute much of the forces applied to the auxiliary framework.

An alternate form of the invention in which the auxiliary framework is secured immediately beneath the floor of the box is shown in Fig. 5. As there shown, the auxiliary framework comprises a pair of sleeves 31 which are secured to the underside of the truck box bottom 32 by means of U-shaped brackets 33, an enlarged detail of which is shown in Fig. 8. The upper ends of the U-brackets 33 are threaded and extend through openings in bottom 32 so that nuts 34 can be secured thereon. In the form shown in Fig. 5, the framework is not carried within the truck box but is rather disposed beneath the floor or bottom 32. The sheath members 31 in the alternate form preferably extend for a short distance beyond the end of the box floor 32 as shown at 35. The framework 36 has elongated members 37 which are slidably mounted within the sheath members 31 in a manner similar to that previously discussed. The cross member 38, however, is built up as shown in Fig. 7 so as to have its upper edge in supporting position under the tail gate 39 in a plane coincident with that of floor or bottom 32 as shown in the dotted line position of Fig. 6. The upright posts 40 are offset to the outside of each of the elongated members 37 so that when the device is in its retracted position against the box as shown in Fig. 7 the tail gate 39 may be swung upwardly and downwardly without interference from the framework 36.

The mode of securing the extendible frame 36 is similar to that shown in the first form, keys 41 being employed in connection with openings passing through the short extensions 35 of the sheath members 31 as shown in Fig. 5. The keys or pegs 41 pass through the sheaths 31 and through corresponding openings 42 and 43 as shown in Fig. 5. When the keys 41 are in engagement with the openings 42 in the elongated members 37 the extendible frame 36 will be in the dotted line position of Fig. 6. In this shortly extended position, the tail gate 39 may rest upon the cross piece 38 in level condition as previously described. When, however, the extendible frame 36 is moved rearwardly to the full line position of Fig. 6 with the keys or pegs 41 passing through openings 43 then additional bracing means such as the cable 44 may be employed, the cable extending between fastening means 45 at the rear of the truck box 10 and a connector 46 on the extendible framework 36. A cable tightener 47 of conventional structure may be interposed medially of the ends of cable 44 so as to place each of the cables under tension after the framework 36 has been secured in its extended position.

It will be noted that in the alternate form shown in Figs. 5, 6, 7 and 8 that none of the auxiliary framework is positioned within the truck box 10, the sheath members 31 and the extendible framework 36 being mounted underneath the bottom or floor 32 and closely adjacent the bottom side edges and the rear of truck box 10.

It may thus be seen that I have provided a simple auxiliary framework or rack for mounting in close cooperation with the box of a pickup truck, the framework being easily and quickly extendible to one of several preselected positions whereby lengths of material such as ladders and scaffolding may be conveniently carried thereon, some of the load being supported by the bottom of the box and the remainder by the auxiliary framework. My invention adds immeasurably to the utility of small pickup type trucks.

It will, of course, be understood that various changes may be made in the form, details, arrangement and proportions of the parts without departing from the scope of my invention.

What I claim is:

1. An auxiliary frame for a truck box on a pick-up type of truck having a flat bottom and short upstanding side panels secured rigidly to the side edges of said flat bottom, said auxiliary frame comprising a pair of spaced parallel sheath members, one each rigidly disposed closely adjacent the juncture of a side panel with the flat bottom of the truck box for substantially the length thereof, a support frame having a pair of elongated members telescopically received respectively within said sheath members and having a crossbar rigidly interconnecting the outer ends thereof and providing a clear and unobstructed space in the medial area of the frame, an upstanding corner post rigidly secured at each side of the frame at the juncture between the crossbar and each elongated telescopically received member, said upstanding post being substantially the same height as that of the side panels on said truck box, said support frame being adapted to lie in close clearance with the rectilinear edge portions of the truck box when in collapsed position and further adapted to be extended rearwardly and substantially in the planes of the flat bottom and side panels for effectively increasing the supporting area of the bottom and sides of said truck box, and securing means between said support frame and the sheath members for rigidly holding the frame in preselected extended position.

2. An auxiliary frame for a truck box on a pick-up type of truck having a flat bottom and short upstanding side panels secured rigidly to the side edges of said flat bottom, said auxiliary frame comprising a pair of spaced parallel sheath members, one each rigidly disposed closely adjacent the edge juncture of a side panel with the flat bottom of the truck box for substantially the length thereof, an elongated member slidably received within each of said sheath members, a rigid crossbar interconnecting the rearward ends of said elongated members in a general U-shape, an upright retaining member rigidly joined to the corner juncture between each of said elongated members and said crossbar, said support frame being adapted to lie in close clearance with the rectilinear edge portions of the truck box when in collapsed position and further adapted to be extended rearwardly and substantially in the planes of the flat bottom and side panels for effectively increasing the supporting area of the bottoms and sides of said truck box, a retractable interconnecting member secured at each side of the support frame adjacent the lower ends of said upright retaining members and extending to the upper rear corners respectively of the truck box, and an abutment on each of said sheath members for retaining the support frame in its outwardly extended position.

3. The subject matter of claim 2, said retractable interconnecting member having interposed therein a tightener for stressing the support frame upwardly and inwardly against said abutments.

References Cited in the file of this patent

UNITED STATES PATENTS

| | | |
|---|---|---|
| 1,366,771 | Devencenzi | Jan. 25, 1921 |
| 2,052,483 | Monteith | Aug. 25, 1936 |
| 2,442,889 | Deal | June 8, 1948 |
| 2,468,579 | Vuori | Apr. 26, 1949 |